United States Patent
Nefcy et al.

(10) Patent No.: US 10,081,364 B2
(45) Date of Patent: Sep. 25, 2018

(54) SYSTEM AND METHOD FOR CONTROLLING A TRANSMISSION GEAR SHIFT

(71) Applicant: Ford Global Technologies, LLC, Dearborn, MI (US)

(72) Inventors: Bernard D. Nefcy, Novi, MI (US); Christopher Alan Lear, Dearborn, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 14/993,431

(22) Filed: Jan. 12, 2016

(65) Prior Publication Data
US 2017/0197628 A1    Jul. 13, 2017

(51) Int. Cl.
*B60W 20/30* (2016.01)
*B60W 20/50* (2016.01)
*B60W 30/20* (2006.01)
*B60K 6/36* (2007.10)
*B60W 10/02* (2006.01)
(Continued)

(52) U.S. Cl.
CPC ............... *B60W 30/20* (2013.01); *B60K 6/36* (2013.01); *B60L 7/14* (2013.01); *B60L 11/14* (2013.01); *B60L 15/2054* (2013.01); *B60W 10/02* (2013.01); *B60W 10/08* (2013.01); *B60W 20/00* (2013.01); *B60L 2240/423* (2013.01); *B60L 2240/48* (2013.01); *B60L 2240/486* (2013.01); *B60L 2240/50* (2013.01); *B60L 2270/145* (2013.01); *B60W 2510/0208* (2013.01); *B60W 2510/104* (2013.01); *B60W 2510/1005* (2013.01); *B60W 2510/1015* (2013.01); *B60W 2710/021* (2013.01); *B60W 2710/083* (2013.01); *B60Y 2200/92* (2013.01); *B60Y 2300/74* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/915* (2013.01)

(58) Field of Classification Search
CPC ................. B60W 20/30; B60W 20/50; B60K 2006/4825
See application file for complete search history.

(56) References Cited

U.S. PATENT DOCUMENTS 6,634,986 B2 * 10/2003 Kima ..................... B60K 6/365
                                                                                              475/5
8,525,467 B2    9/2013 Gee et al.
(Continued)

FOREIGN PATENT DOCUMENTS

JP    2010116121 A  *  5/2010
WO   2015087132 A1    6/2015

*Primary Examiner* — Tisha D Lewis
(74) *Attorney, Agent, or Firm* — David B. Kelley; Brooks Kushman P.C.

(57) ABSTRACT

A system and method for controlling a transmission gear shift in a vehicle having a driveline and an electric motor operable to output torque to the driveline includes applying a negative motor torque to the driveline to reduce driveline oscillations resulting from the transmission gear shift. The negative motor torque is based on vehicle conditions occurring after the transmission gear shift has begun and before the transmission gear shift is complete.

12 Claims, 4 Drawing Sheets

(51) Int. Cl.
*B60W 10/08* (2006.01)
*B60W 20/00* (2016.01)
*B60L 7/14* (2006.01)
*B60L 11/14* (2006.01)
*B60L 15/20* (2006.01)

(56) References Cited

U.S. PATENT DOCUMENTS

| | | | |
|---|---|---|---|
| 8,718,854 B2 | 5/2014 | Hashimoto | |
| 9,102,324 B2 | 8/2015 | Kim et al. | |
| 2005/0054480 A1* | 3/2005 | Ortmann | B60K 6/365 |
| | | | 477/6 |
| 2007/0293362 A1* | 12/2007 | Kamada | B60K 6/365 |
| | | | 475/5 |
| 2011/0098151 A1* | 4/2011 | Ziemer | B60K 6/442 |
| | | | 477/20 |
| 2013/0297109 A1 | 11/2013 | Nefcy et al. | |
| 2017/0101101 A1* | 4/2017 | Cho | B60W 30/18127 |

* cited by examiner

SYSTEM AND METHOD FOR CONTROLLING A TRANSMISSION GEAR SHIFT

TECHNICAL FIELD

The present disclosure relates to a system and method for controlling a transmission gear shift in a vehicle.

BACKGROUND

Electric vehicles, hybrid electric vehicles (HEV's), plug-in hybrid electric vehicles (PHEV's) and other vehicles that utilize an electric machine, such as an electric motor, may be configured to use the electric machine to provide regenerative braking to at least assist in stopping the vehicle. Regenerative braking may provide a number of advantages over using a friction braking system exclusively. For example, the use of regenerative braking, whereby an electric motor provides negative torque to the vehicle wheels, reduces wear on the friction elements of the friction braking system. In addition, during regenerative braking, the motor may function as a generator, producing electricity that may be used immediately or stored in a storage device, such as a battery.

During Regenerative Braking the transmission may downshift as the vehicle speed decreases. In vehicles having a conventional powertrain, including an automatic transmission, the torque converter may be used for torsional isolation during the downshift. The torque converter clutch is slipped during power-on upshifts and coasting downshifts so as to impart a smooth feeling to the vehicle occupants. This smooth feeling is due to the removal of a hard coupling to the driveline during shifting. The slipping in the torque converter clutch usually increases input speed above the turbine, and pump and line pressures are not affected. During coasting shifts, relatively small negative torques are applied to the input—for example by shutting off one or more cylinders in a variable displacement engine—and any slip that is generated is well controlled.

During large negative torque regen downshifts—i.e., a transmission gear downshift during a regenerative braking event—the drawbacks associated with using a torque converter to isolate driveline disturbances is increased, largely from the lower speeds of the transmission pump that could occur. Lower pump speed adversely affects controllability of the torque converter clutch to control negative slip. For this reason, the torque converter often remains locked during regen shifting. This locked torque converter clutch increases the chance of driveline oscillation when the oncoming shifting clutch finally stops slipping after the ratio change. The landing of this clutch at synchronous speed using pressure control may be difficult.

One alternative to using pressure control is to use the electric motor to damp or otherwise control the driveline oscillations. The use of active motor damping after the shift may reduce driveline oscillations; however, there is a lag between the end of the shift and when the active motor damping begins to control the driveline oscillations. During this lag, the driveline oscillations may be noticeable, resulting in a poor shift quality being perceived by the vehicle occupants.

SUMMARY

At least some embodiments of the present invention include a method for controlling a transmission gear shift in a vehicle having a driveline and an electric motor operable to output torque to the driveline. The method includes applying a negative motor torque to the driveline to reduce driveline oscillations resulting from the transmission gear shift. The negative motor torque is based on vehicle conditions occurring after the transmission gear shift has begun and before the transmission gear shift is complete.

At least some embodiments of the present invention include a method for controlling a transmission gear shift in a vehicle having a driveline and an electric motor operable to output torque to the driveline. The method includes applying a negative motor torque to the driveline to reduce driveline oscillations resulting from the transmission gear shift, where the negative motor torque is based on vehicle conditions occurring at a stage of the transmission gear shift prior to completion of the transmission gear shift.

At least some embodiments of the present invention include system for controlling a transmission gear shift in a vehicle having a driveline. The system includes an electric motor operable to output torque to the driveline, and at least one controller configured to control the motor to apply a torque to the driveline to reduce driveline oscillations resulting from the transmission gear shift. The torque is based on vehicle conditions occurring after the transmission gear shift has begun and before the transmission gear shift is complete.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
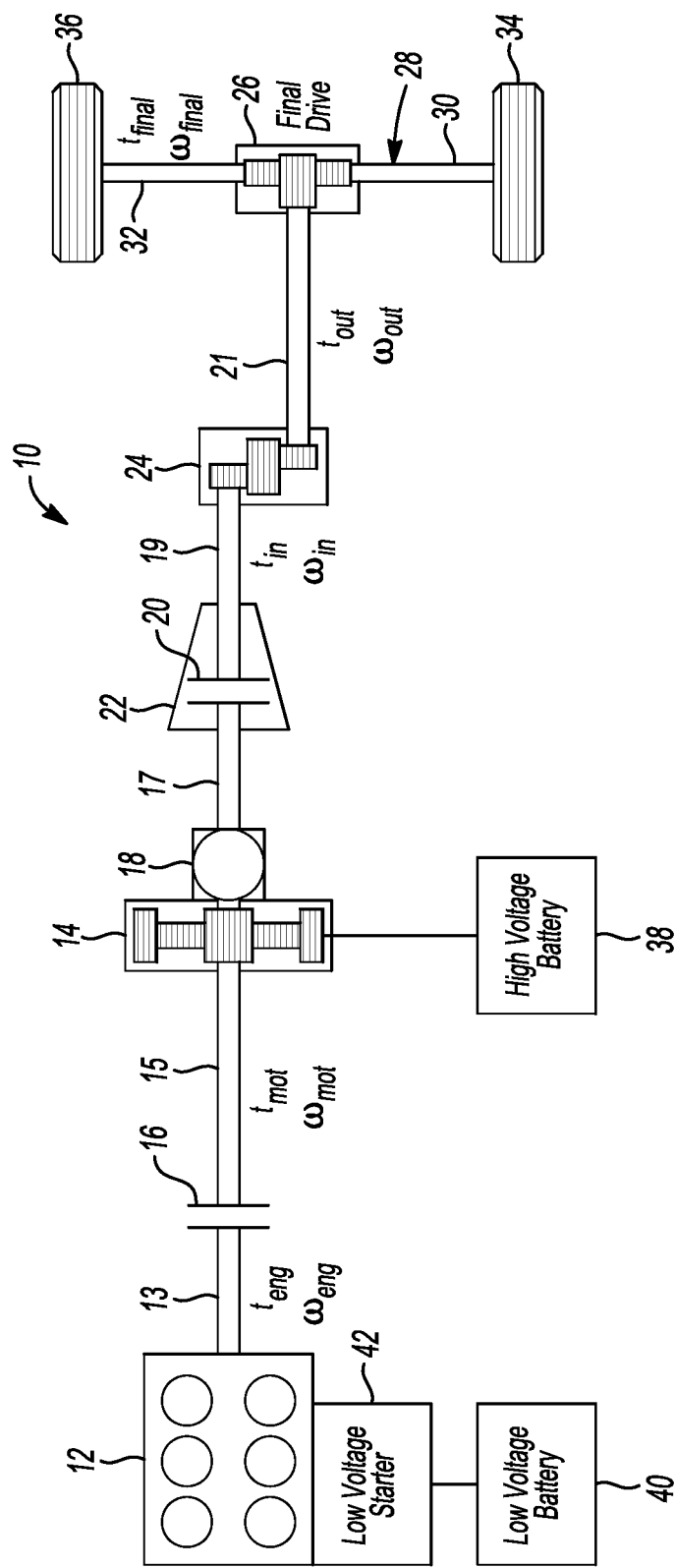
FIG. 1 is a schematic representation of a portion of a hybrid electric vehicle having a control system capable of implementing a method in accordance with embodiments of the present invention.

FIG. 1 shows a portion of a vehicle 10, which, as explained in more detail below, includes a control system capable of implementing a method in accordance with embodiments of the present invention. The vehicle 10 includes an engine 12 and an electric machine 14, which can operate as a motor to output torque and as a generator to receive torque and output electrical energy. Disposed between the engine 12 and the motor 14 is a disconnect clutch 16. A transmission pump 18, which in this embodiment is a mechanical pump, is connected to and powered by the motor 14. The pump 18, which may be the only transmission pump, or which may work in conjunction with an auxiliary pump, provides hydraulic output to operate the disconnect clutch 16 as well as a torque-converter bypass clutch 20, which works in conjunction with a torque converter 22. It should be noted that embodiments of the present invention are not limited to the vehicle architecture described in FIG. 1—as one example, the torque converter 22 and bypass clutch 20 may be replaced with a launch clutch or other system that allows torque to be transferred through the driveline.

The vehicle 10 also includes a transmission gearbox 24, which receives the output from the torque converter 22. The bypass clutch 20, torque converter 22 and transmission gearbox 24 may comprise a step-ratio transmission, which is distinguished from a continuous variable transmission (CVT). The transmission gearbox 24 provides an output to final drive gearing 26, which may be a differential, and provides torque to or receives torque from a driven axle 28—or more particularly half-axles 30, 32—and vehicle drive wheels 34, 36. Part of the vehicle electrical system includes a high-voltage battery 38, which may be used, for example, to provide electrical power to the motor 14. On the low-voltage side, a low-voltage battery 40 is connected to a low-voltage starter 42, which can be used to start the engine 12. It is understood that the high-voltage battery 38 and the low-voltage battery 40 are part of a larger electrical system, and may provide power to various electrical loads in the vehicle 10.

In FIG. 1, the outputs and the inputs of the various vehicle systems are also illustrated. For example, the engine 12 outputs both a torque ($t_{eng}$) and a speed ($\omega_{eng}$) to an engine output shaft 13, and on the other side of the disconnect clutch 16 an input torque ($t_{mot}$) and input speed ($\omega_{mot}$) provide inputs into the motor 14 through the shaft 15. Alternatively, the motor torque and speed may represent outputs rather than inputs, and in such a case, the motor 14 can provide an input torque to the engine 12, for example, as an alternative to the low-voltage starter 42. When the motor 14 is being operated as a generator, it can provide electrical power to charge the high-voltage battery 38.

The transmission gearbox 24 receives both a torque ($t_{in}$) and speed ($\omega_{in}$) input, which will be a function of the output of the engine 12, the position of the disconnect clutch 16, the output of the motor 14, and the operation of the bypass clutch 20 and torque converter 22. The transmission gearbox 24 receives the torque and speed input through a shaft 17 on an output side of the motor 14 and an input side of the torque converter 22, and a shaft 19 on the output side of the torque converter 22. The output from the transmission gearbox 24 ($t_{out}$) and ($\omega_{out}$) is through a shaft 21, and is received by the differential gearing 26 and transmitted to the drive wheels 34, 36 through the axle 28, and represents the final torque ($t_{final}$) and speed ($\omega_{final}$) output. Alternatively, during regenerative braking, the drive wheels 34, 36 supply torque through the gearing and back to the motor 14. Any or all of the shafts 13, 15, 17, 19, 21, 30, 32 constitute the driveline for the vehicle 10; however, driveline oscillations in the shafts 21, 30, 32, may be one area of focus for embodiments of the present invention. This is because the portion of a vehicle driveline that is downstream from the transmission is where most "ringing" occurs—i.e., where the oscillations caused by the transmission gear shift excite the driveline components at or near their resonant frequency.

Figure 2:
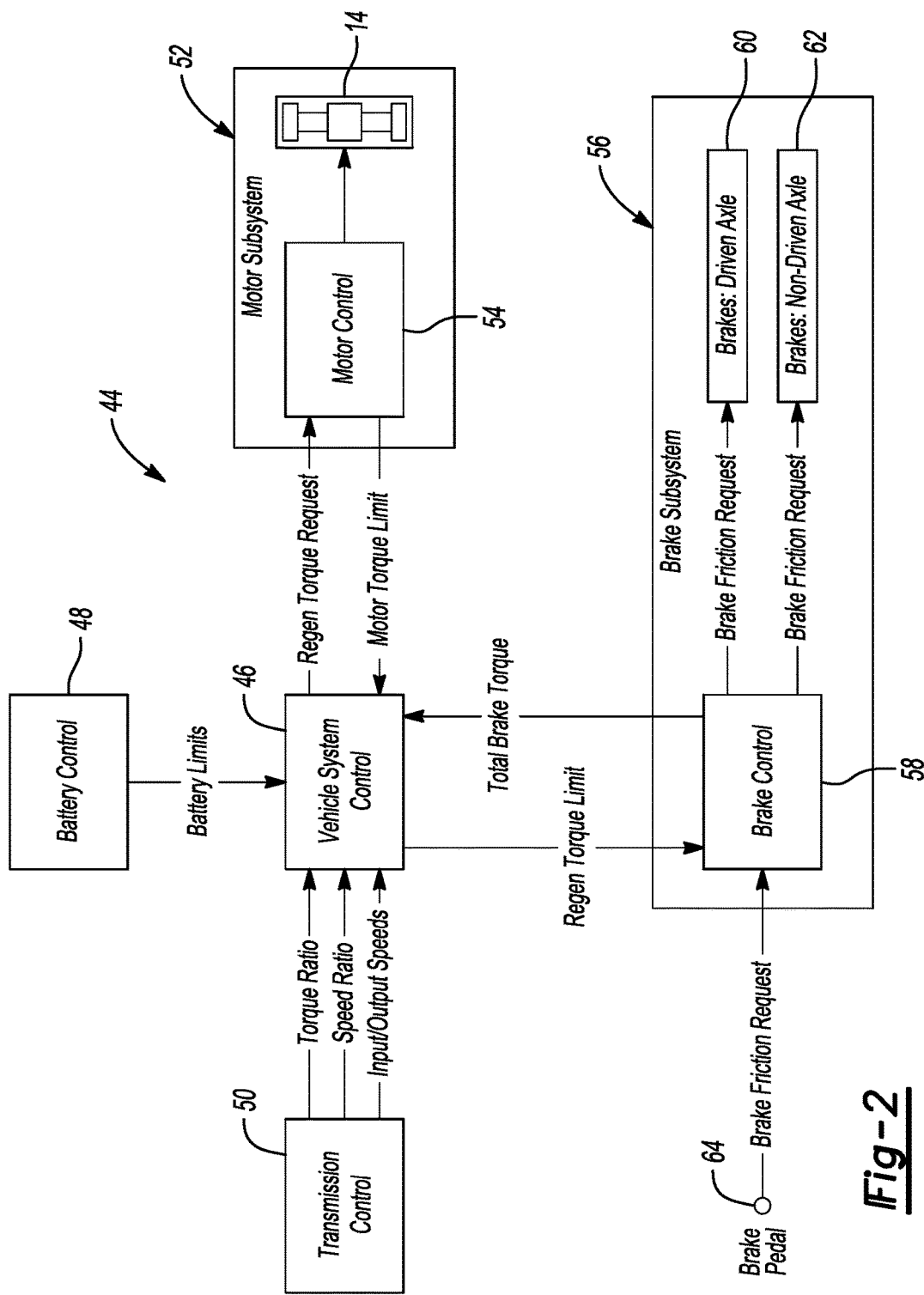
FIG. 2 is a schematic representation of a control system architecture in accordance with embodiments of the present invention.

FIG. 2 shows a schematic representation of a control system 44 in accordance with embodiments of the present invention. Shown in FIG. 2, is a vehicle system control 46, which may include a single vehicle system controller (VSC), or any number of individual hardware and software controllers connected to each other. In the embodiment illustrated in FIG. 2, the vehicle system control 46 sends and receives various signals to other controllers in the control system 44. This communication may occur, for example, over a controller area network (CAN). A battery control 48 provides as an input into the vehicle system control 46 certain battery limits, which may be useful for controlling the charging and discharging of the batteries 38, 40. A transmission control 50 provides torque and speed ratios, as well as input and output speeds to the vehicle system control 46. As discussed in more detail below, this may be important, for example, to determine how to control the wheel torque to avoid driveline disturbances during a transmission gear shift.

Also shown in FIG. 2, is a motor subsystem 52, which includes the motor 14 and a motor control 54. Among other things, the motor controller 54 receives a regenerative torque request from the vehicle system controller 46, and provides motor torque limits back to the vehicle system controller 46. A brake subsystem 56 includes a brake control 58, which communicates with brakes 60 on the driven axle—see the axle 28 in FIG. 1—and also communicates with brakes 62 on the non-driven axle. Communicating with the vehicle system controller 46, the brake controller 58 outputs total brake torque and receives regenerative torque limits. Finally, a brake pedal 64 is shown providing a brake request to the brake controller 58. Although certain inputs and outputs are illustrated in the schematic diagram shown in FIG. 2, it is understood that other signals and information can be communicated between some or all of the controllers illustrated in the control system 44. In addition, some vehicles may include a different configuration of controllers while still providing the system management for implementing methods in accordance with embodiments of the present invention.

Figure 3:
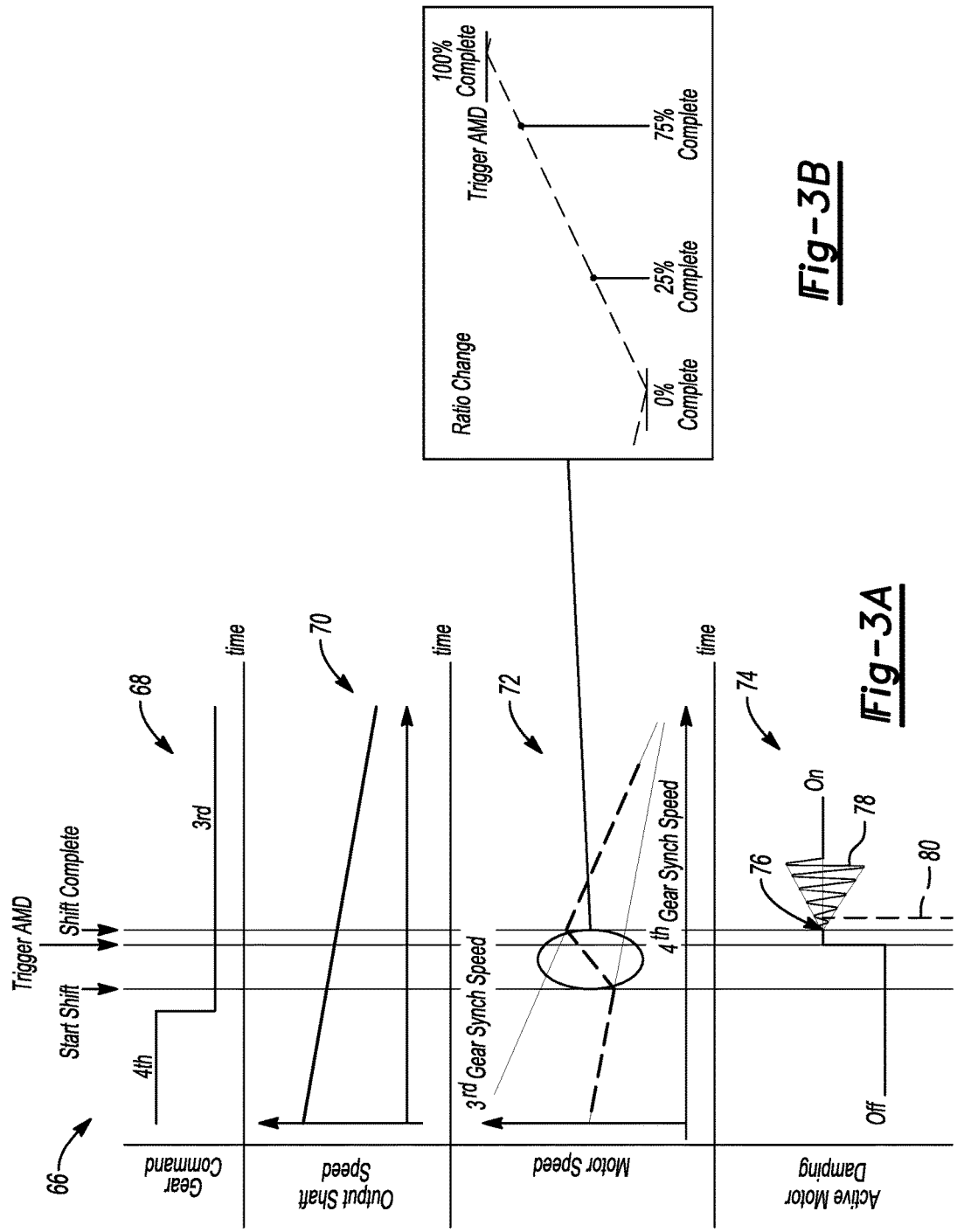
FIGS. 3A and 3B are graphs illustrating various vehicle conditions during implementation of an embodiment of the present invention.

FIG. 3A shows a graph 66 illustrating various vehicle conditions during implementation of an embodiment of the present invention. For example, a first portion 68 of the graph 66 shows the point at which a transmission gear shift occurs, changing from fourth-year to third gear. A second portion 70 of the graph 66 shows the change in output shaft speed throughout the transmission gear shift process. The output shaft being referred to is the output shaft of the transmission, for example, shaft 21 as illustrated in FIG. 1. A third portion 72 of the graph 66 shows the change in motor speed throughout the gear shift process, and the last portion 74 illustrates the implementation of an active motor damping (AMD) strategy in accordance with embodiments of the present invention.

Embodiments of the present invention may include, for example, a method for controlling a transmission gear shift that includes the step of applying a negative motor torque to the driveline to reduce driveline oscillations resulting from the transmission gear shift. The negative motor torque can be based on vehicle conditions occurring after the transmission gear shift has begun, but before the transmission gear shift is complete. The "vehicle conditions" referred to above may include, for example, those conditions illustrated in FIG. 3A, such as a speed of the transmission output shaft, the motor speed, etc. As shown in FIG. 3A, a gear change is commanded from fourth gear to third gear, but as indicated by the vertical "Start Shift" line, the actual shift begins slightly after the gear change is commanded. As described above, waiting until after a transmission gear shift is complete before calculations are made to determine a desired active motor damping may lead to the control process being implemented after the driveline disturbances have already had an undesirable impact on drivability as perceived by the vehicle occupants. Therefore, embodiments of the present invention may begin the process of determining the parameters for active motor damping while the transmission gear shift is still in process. In FIG. 3A, this is indicated by the vertical line "Trigger AMD".

As shown in FIG. 3A, the Trigger AMD point is closer to the end of the shift than it is to the start of the shift. This is because at the beginning of a transmission gear shift, the transient vehicle conditions may result in an undesirably large negative motor torque calculation—i.e., the resulting AMD torque may overcompensate for the driveline oscillations. In addition, a transmission control subsystem, such as the transmission control 50 shown in FIG. 2, is controlling the shift at an early stage of the shift, and it may be undesirable to also have the AMD controllers—e.g., the vehicle system controller 46 and motor controller 54—compete with the transmission controller 50. Therefore, in the embodiment illustrated in FIG. 3A, the AMD trigger occurs when the shift is about 75% complete—see also the inset shown in FIG. 3B.

The point at which the "Trigger AMD" occurs, is a calibratable value that can be chosen by the control system architect. For example, it may be conveniently delineated by a predetermined percentage of completion of the transmission gear shift. One way that the percentage of completion of transmission gear shift may be indicated, is by comparison of or differences between an output speed of the transmission to an input speed of the transmission that is translated to an off-going gear ratio in the transmission and also a comparison to the input speed of the transmission translated to an oncoming gear ratio in the transmission. Essentially, by looking at the output speed of the transmission compared to what would be expected as an input speed for the current transmission gear—which, in the example shown in FIG. 3A is fourth gear—and also looking at the output speed of the transmission compared to what would be expected as an input speed for the new transmission gear—e.g., third gear—the percentage of completion for the transmission gear shift can be determined.

In a vehicle, such as the vehicle 10 shown in FIG. 1, the speed of the various rotating elements are either directly measured, estimated, or calculated from other known speeds given the known gear ratios between the elements. These speed signals can be sent to one or more of the controllers, for example, the vehicle system controller 46, which can then use this information to determine whether or not the transmission gear shift is at the predetermined stage for beginning the process of calculating the AMD controls. Although the "Trigger AMD" position is at 75% of the gear shift completion in the embodiment shown in FIG. 3A, other points may be chosen and as the predetermined stage of the transmission gear shift to begin the AMD process. For example, in some embodiments, the stage of the transmission gear shift may be greater than 80% of the completion of the transmission gear shift, and in other embodiments, it may be, for example, between 85% and 95% of the transmission gear shift completion.

Once it is determined that calculations of the appropriate AMD control are to begin—i.e., once the predetermined stage of the transmission gear shift is reached—embodiments of the present invention may begin to use the vehicle conditions to determine the appropriate negative motor torque to be output to reduce the driveline oscillations resulting from the transmission gear shift. Although there are any number of different ways in which a desired level of AMD control—e.g., negative motor torque—may be calculated, one such system uses the rotational speed of various driveline components, for example the transmission input and output shafts, applies certain filters, for example a time-delayed adjustable-rate filter, and then multiplies the output by some gain so that it can be used to yield a correction factor. One such system is described in U.S. Patent Application Publication No. 2013/0297109, published on 7 Nov. 2013, which is hereby incorporated herein by reference.

In embodiments of the present invention, these calculations do not begin after the transmission shift is complete, but rather begin at the predetermined stage of the transmission gear shift—e.g., at the predetermined percentage of completion. Once the calculations are made, a negative motor torque may be output from an electric motor, such as the motor 14 shown in FIG. 1, as commanded by a control system, such as the control system 44 shown in FIG. 2. In the embodiment shown in FIG. 3A, application of the negative motor torque to the vehicle driveline occurs immediately at the end of the transmission gear shift, as shown by the point 76. The waves 78 shown in FIG. 3A represent the application of the negative motor torque to the driveline, which compensates for the oscillations which may occur in the driveline, for example, because of the "ringing" resulting from the finalizing of the transmission gear shift—i.e., full engagement of the oncoming clutch. Using AMD control, such as in accordance with embodiments of the present invention, allows a clutch that is disposed between the motor and vehicle drive wheels—for example the clutch 20 shown in FIG. 1—to be controlled such that it is in a locked state during the transmission shift. This is because controlling the driveline oscillations does not require causing the clutch to slip, which, as described above, may be a very difficult type of control during certain conditions, such as a downshift during a regenerative braking event.

Although calculation of the appropriate AMD control prior to completion of the transmission gear shift allows the AMD control to begin immediately upon shift completion, it may be desirable to wait a short time before applying the negative motor torque. For example, the vertical line 80 shown in FIG. 3A shows a position that indicates slight delay in implementation of the AMD control. This position may be calculated as the point at which the oncoming transmission clutch is capacitized to a predetermined level. For example, at the point at which the transmission gear shift has just completed, the oncoming clutch is fully engaged and a synchronous speed has been achieved; however, the pressure in the clutch plates may not be great enough to withstand the application of negative torque to the driveline, which could cause an undesirable slipping. Therefore, embodiments of the present invention may wait until there is an additional pressure in the clutch to maintain full engagement even in the presence of a negative torque resulting from the AMD control—i.e., the clutch is capacitized to a desired level of authority. As an example, an embodiment of the present invention may apply the negative motor torque for the AMD control only after there is an additional 10 Newton meters (Nm) of clutch capacity beyond the initial engagement at the point of shift completion. In other embodiments, different levels of clutch capacity may be chosen as the predetermined level.

Figure 4:
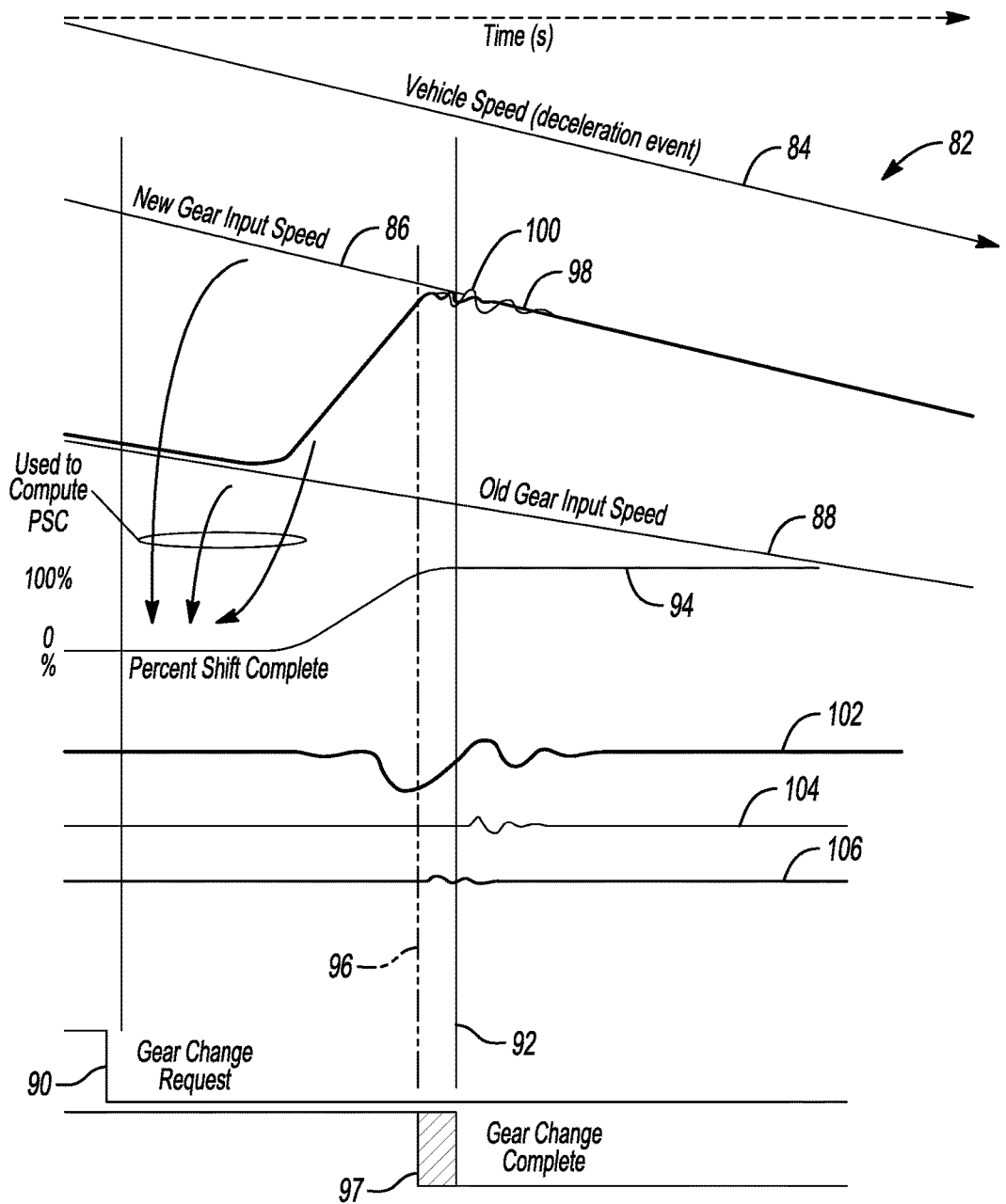
FIG. 4 is a graph illustrating various vehicle conditions during another implementation of an embodiment of the present invention.

As described above in conjunction with FIGS. 3A and 3B, the AMD control, and in particular a negative motor torque, may be applied immediately at the end of a transmission gear shift, or slightly after the shift is complete to allow for additional clutch capacity. In other embodiments of the invention, application of AMD control may take place just before the shift is complete, which may provide even further benefits of reducing driveline oscillations. FIG. 4 shows a graph 82 indicating a number of vehicle conditions, such as vehicle speed 84, new gear input speed 86, old gear input speed 88, the position of a gear change request 90, and the position of the gear change when it is complete 92. As described above, certain vehicle conditions such as the new gear input speed, the old gear input speed and the output speed of the transmission may be used to calculate a percent shift complete as indicated by the line 94 in the graph 82.

In FIG. 4, the vertical line 96 indicates the predetermined percentage of completion of the transmission gear shift—i.e., the point at which the AMD trigger takes place. In this embodiment, however, the AMD control is applied immediately once the calculations and filters are determined. Although this point is also indicated by the vertical line 96, in practice there may be some slight difference in time, which is not indicated in the graph 82. The shaded area 97 between the AMD Trigger 96 and the end of the gear shift 92 is the area in which the calculated AMD controls may be applied to try to maximize their benefit. Indicated at the line 86 for the new gear input speed are two additional lines 98 and 100. The line 100 indicates the level of oscillations occurring when the AMD control is applied at the point of shift completion—i.e. at the line 92—such as illustrated and described above with regard to FIG. 3A. As shown in FIG. 4, these oscillations are relatively small; however, the line 98 shows the oscillations which occur when the AMD control is applied to just prior to the shift and, for example, at the line 96 shown in FIG. 4. Applying the negative motor torque even earlier than the end of the transmission gear shift may provide the benefit of keeping the oscillations initially lower so that application of the AMD control achieves a greater effect more quickly.

This concept is further illustrated in the lines 102, 104, 106 also shown in FIG. 4. The line 102 indicates the oscillations occurring when a torque correction is continuously sampled through the entire transmission gear shift, including the fast transients at the beginning of the shift. The line 102 shows the greatest level of oscillations between the three lines. In contrast, the line 104 shows reduced oscillations for embodiments of the present invention when the AMD trigger occurs just before the end of shift completion, and application of the AMD control occurs at or just after the point of shift completion. Finally, the line 106 indicates the even further reduced oscillations associated with embodiments of the invention which apply the negative motor torque just before the end of the shift completion, such as indicated by the line 98. The predetermined stage of the transmission gear shift at which the AMD trigger is indicated, as well as the point at which the AMD control is actually applied, can be varied for different vehicles, different powertrains, and different vehicle conditions even within a single platform.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a transmission gear shift in a vehicle having a driveline and an electric motor, comprising:
applying a negative motor torque to the driveline to reduce driveline oscillations resulting from the transmission gear shift, the negative motor torque being based on vehicle conditions occurring at a predetermined percentage of completion of the transmission gear shift indicated by a comparison of an output speed of the transmission to:
an input speed of the transmission translated to an off-going gear ratio in the transmission, and
the input speed of the transmission translated to an oncoming gear ratio in the transmission.

2. The method of claim 1, wherein the percentage of completion of the transmission gear shift is between 75% and 95%.

3. The method of claim 1, wherein applying the negative motor torque to the driveline occurs prior to an end of the transmission gear shift.

4. The method of claim 1, wherein applying the negative motor torque to the driveline occurs after an end of the transmission gear shift when an oncoming clutch is capacitized to a predetermined level.

5. A method for controlling a transmission gear shift in a vehicle having a driveline and an electric motor, comprising:
applying a negative motor torque to the driveline after an end of the transmission gear shift when an oncoming clutch is capacitized to a predetermined level, the negative motor torque being based on vehicle conditions occurring at a stage of the transmission gear shift prior to completion of the transmission gear shift.

6. The method of claim 5, wherein the stage of the transmission gear shift is indicated by differences between an output speed of the transmission, an input speed of the transmission translated to an off-going gear ratio, and an input speed of the transmission translated to an oncoming gear ratio.

7. The method of claim 5, wherein the stage of the transmission gear shift is greater than 80% of completion of the transmission gear shift.

8. The method of claim 5, the vehicle further having a clutch disposed between the motor and vehicle drive wheels, the method further comprising controlling the clutch to be in a locked state during the transmission gear shift.

9. A system for controlling a transmission gear shift in a vehicle having a driveline, comprising:
an electric motor; and
at least one controller configured to control the motor to apply a torque to the driveline to reduce driveline oscillations resulting from the transmission gear shift, the torque being based on vehicle conditions occurring after the transmission gear shift has begun and at a predetermined percentage of completion of the transmission gear shift indicated by a comparison of an output speed of the transmission to an input speed of the transmission translated to an off-going gear ratio in the transmission, and the input speed of the transmission translated to an oncoming gear ratio in the transmission.

10. The system of claim 9, wherein the percentage of completion of the transmission gear shift is between 85% and 95%.

11. The system of claim 9, wherein the at least one controller is further configured to control the motor to apply the torque to the driveline prior to an end of the transmission gear shift.

12. The system of claim 9, wherein the at least one controller is further configured to control the motor to apply the torque to the driveline after an end of the transmission gear shift when an oncoming clutch is capacitized to a predetermined level.

\* \* \* \* \*